(12) United States Patent
Mac Farland

(10) Patent No.: US 6,390,532 B1
(45) Date of Patent: May 21, 2002

(54) RETRACTABLE HARD TOP

(75) Inventor: David Mac Farland, Unterschleissheim (DE)

(73) Assignee: Dura Convertible Systems GmbH, Cologne (DE)

( * ) Notice: Subject to any disclaimer, the term of this patent is extended or adjusted under 35 U.S.C. 154(b) by 0 days.

(21) Appl. No.: 09/686,845

(22) Filed: Oct. 11, 2000

(30) Foreign Application Priority Data

Oct. 21, 1999 (EP) .............................................. 99120353

(51) Int. Cl.[7] .................................................. B60J 7/00
(52) U.S. Cl. .................... 296/107.17; 296/108; 296/116
(58) Field of Search ........................... 296/107.17, 108, 296/116

(56) References Cited

U.S. PATENT DOCUMENTS

| 4,729,592 A | * | 3/1988 | Tuchiya et al. | 296/116 |
| 4,776,630 A | * | 10/1988 | Fukutomi et al. | 296/107 |
| 5,195,798 A | * | 3/1993 | Klein et al. | 296/107 |
| 5,520,432 A | * | 5/1996 | Gmeiner et al. | 296/107 |
| 5,542,735 A | * | 8/1996 | Furst et al. | 296/107 |
| 5,584,522 A | * | 12/1996 | Kerner et al. | 296/107 |
| 5,593,202 A | * | 1/1997 | Corder et al. | 296/116 |
| 5,769,483 A | * | 6/1998 | Danzl et al. | 296/107 |
| 5,806,912 A | * | 9/1998 | Ramaciotti et al. | 296/107 |
| 5,810,413 A | | 9/1998 | Siring et al. | 296/37.5 |
| 6,019,416 A | * | 2/2000 | Beierl | 296/107.17 |
| 6,053,560 A | * | 4/2000 | Rothe | 296/107.17 |
| 6,062,625 A | * | 5/2000 | Eleurieder et al. | 296/108 |
| 6,131,988 A | * | 10/2000 | Queveau et al. | 296/107.17 |

FOREIGN PATENT DOCUMENTS

| DE | 34 16 286 A1 | 10/1984 |
| DE | 196 34 510 C1 | 1/1998 |

* cited by examiner

*Primary Examiner*—Ken Patel
(74) *Attorney, Agent, or Firm*—David A. Greenlee

(57) ABSTRACT

The present invention refers to a retractable hard top (3) for motor vehicles (1), comprising: a first upper substantially rigid roof section which forms a substantially horizontal upper roof section, a second substantially rigid rear roof section (5), which is hingedly connected to the first roof section (5) via a first rod assembly (31, 33) and to the motor vehicle, and which forms a substantially vertically or obliquely extending rear roof section, and a rigid rear window (9) which is pivotally arranged at the second roof section (7) and which is commonly movable therewith, wherein when pivoting the second roof section (7) into a retractable position in the motor vehicle, the rear window (9) is pivoted into the interior of the second roof section (7).

7 Claims, 5 Drawing Sheets

RETRACTABLE HARD TOP

BACKGROUND OF THE INVENTION

1. Field of the Invention

The present invention refers to a retractable hard top for motor vehicles and to motor vehicles that are provided with a hard top of that kind.

2. Description of the Prior Art

Motor vehicles in the form of convertibles enjoy an increasing popularity, wherein they are permanently confronted with the question of all-weather suitability. Regarding the suitability of non-seasonal vehicles, considerably higher quality demands are made on the roof structure, in particular in a way that retractable vehicle roofs in closed condition shall basically have the quality of a roof of a sedan.

Besides the demands on the corresponding tightness of such retractable roofs, a traffic security in the rear optic is also demanded, which leads to the fact that the rear window of the motor vehicle is no longer formed of plastic but of glass, and may comprise useful additional features such as heating wires.

The rigid and usually rearwardly curved glass pane requires a lot of space for the roof to be lowered when lowering the rear roof section, which leads to problems in mounting other parts of the motor vehicle, in particular the fuel tank. This applies even more since convertibles or roadsters which are usually two-seat vehicles shall usually have an especially small and compact design.

BRIEF SUMMARY OF THE INVENTION

Thus, the object of the present invention is to provide a retractable hard top for motor vehicles, which comprises an especially space-saving construction in the lowered condition.

According to the present invention, a retractable hard top for motor vehicles is provided, comprising:

A first substantially rigid upper roof section, which forms an essentially horizontal upper roof portion of the motor vehicle,

- a second substantially rigid rear roof section which is connected to the first roof section via a first rod assembly and which is hingedly connected to the motor vehicle and which forms a substantially vertically or obliquely extending rear roof portion, and
- a rigid rear window, which is pivotally connected to the second roof section and which is commonly movable with same, wherein when pivoting the second roof section into a retractable position of the motor vehicle, the rear window is pivoted into the interior of the second roof section.

Thereby it is achieved that the space for the lowered hard top can be significantly reduced, whereby the space requirement of the retractable hard top can be significantly reduced and the components of the motor vehicle, such as the fuel tank, can be dimensioned sufficiently large. Moreover, the advantage results that due to the reduced space requirement of the hard top a correspondingly more rigid construction of the motor vehicle becomes possible and additional significant reinforcement measures can be renounced, which makes the total construction of the motor vehicle definitely more inexpensive.

The retractable hard top according to the invention comprises a series of further great advantages, that will now be described.

By the fact that the rear window is connected in its lower portion in the area of the longitudinal side of the vehicle with one rod each, wherein each of the two rods is hingedly connected in a hinge point with two connection rods, one of which being connected to the vehicle, the other one of which being hingedly connected to the second rear roof section, it is achieved that a positive guide of the rear window when retracting or extracting the retractable hard top is provided. The design has a very simple structure and it is very functional and offers a safe operation over a long period of time, wherein additional components such as accessory motor drives can be avoided.

As usual, the retractable hard top according to the invention comprises an axially symmetrical structure regarding the longitudinal axis of the motor vehicle. The arrangement of the rod assembly is carried out at the longitudinal side portions and is made symmetrical with respect to the longitudinal axis of the motor vehicle.

Advantageously the connection rod assembly of the first and second roof section comprises for each longitudinal side of the motor vehicle an essentially straight and an essentially curved or bent, hingedly arranged connection rod. By means of the total of four connection rods, two for each side of the vehicle, an especially simple mechanism for folding or extracting the upper first roof section with respect to the second rear roof section is provided.

Furthermore, the curved connection rods are hingedly connected to the second rod assembly, whereby advantageously a positively guided pivot movement of the rear second roof section along with the upper first roof section is enabled.

Furthermore, the first upper roof section comprises a slot in the area of the longitudinal side of the motor vehicle through which the straight and curved or bent connection rods move when pivoting the upper roof section. Thereby the possibility of pivoting the upper roof section and accommodation into the rear roof section is enabled in a simple manner.

Advantageously, the retractable hard top according to the invention comprises a flexible outer cover, e.g. made of a textile tissue, such as a cloth, which is connected to the first front roof section in its front portion and to the second roof section. This in particular also has the advantage that the first and second roof sections can be made of a plastic member, in which special surface treatments, in particular a coat of lacquer, are not required. Thus, the entire hard top can be formed in an inexpensive manner.

The present invention also refers to a motor vehicle, in particular a convertible. Such a motor vehicle comprises an accommodation chamber for a roof cover that can be stored therein. According to the invention, the roof cover comprises a retractable hard top which comprises features as described above.

The hard top accommodation space further advantageously comprises a bottom section which is arranged pivotally around a pivot axis extending substantially transversely and horizontally with respect to the longitudinal extension of the motor vehicle. Thereby it is enabled that when the roof is closed, the bottom section can be pivoted upwardly which significantly increases the trunk volume.

BRIEF DESCRIPTION OF THE DRAWINGS

Further details, features and advantages of the present invention can be derived from the following description with reference to the drawing.

DETAILED DESCRIPTION OF THE INVENTION

Figure 1:
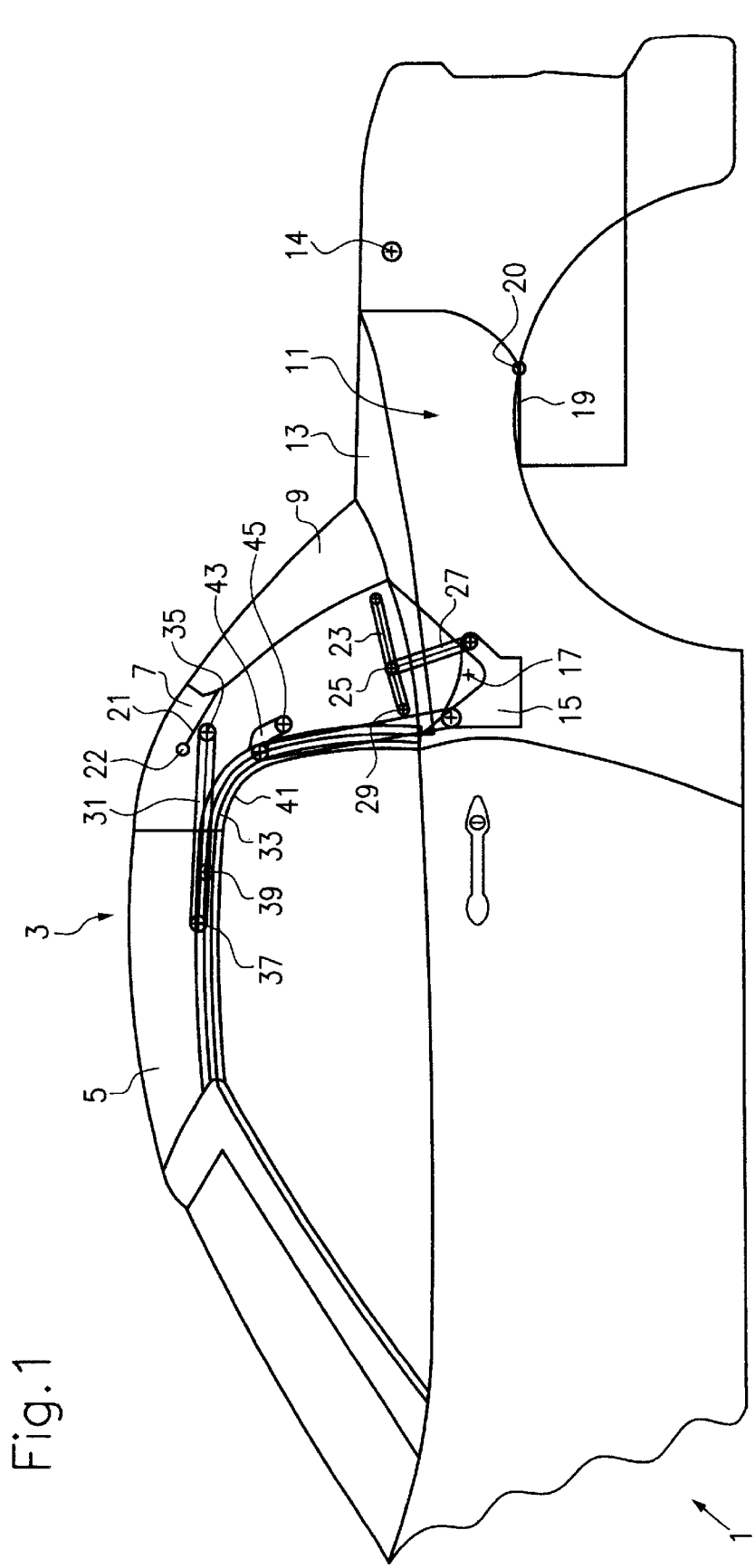
FIG. 1 shows a diagrammatic side view of a convertible having a retractable hard top in closed position.

Now the retractable hard top and the motor vehicle equipped with this hard top according to the invention will be described closer. In the FIGS. the same elements are designated by the same reference numerals.

FIG. 1 diagrammatically shows in a side view a motor vehicle 1 in the form of a convertible. The motor vehicle 1 comprises a retractable hard top 3, which in the position shown in FIG. 1 forms the closed condition of the hard top.

The retractable hard top 3 comprises a first substantially rigid upper roof section 5 and a second substantially rigid rear roof section 7. A rear window 9 is arranged in the rear roof section 7, said window being formed as a rigid pane, in particular made of glass.

The motor vehicle 1 further comprises an accommodation space 11 for the hard top 3 and further comprises a cover 13 that is pivotally connected at the motor vehicle around an axis 14 and is in sealing cover position in FIG. 1.

The retractable hard top 3 is connected via a pedestal or a support plate 15 to the motor vehicle. The rear second roof section 7 is supported pivotally around an axis to the support plate 15. As an alternative, it may also be directly connected to the motor vehicle and it may pivot around the axis 17.

Figure 2:
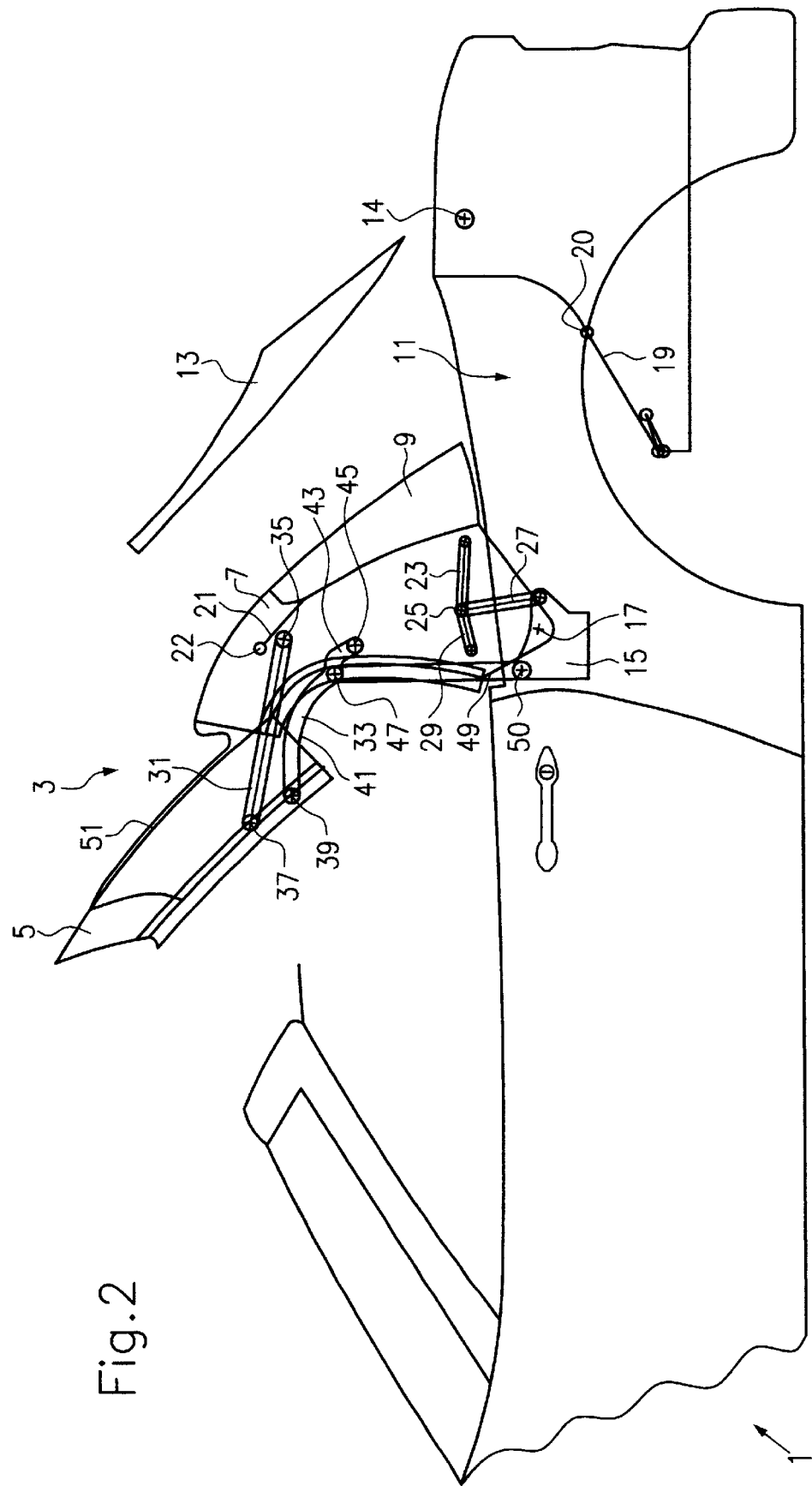
FIG. 2 shows a first open position of the retractable hard top at the start of the retractable position of the hard top.
Figure 3:
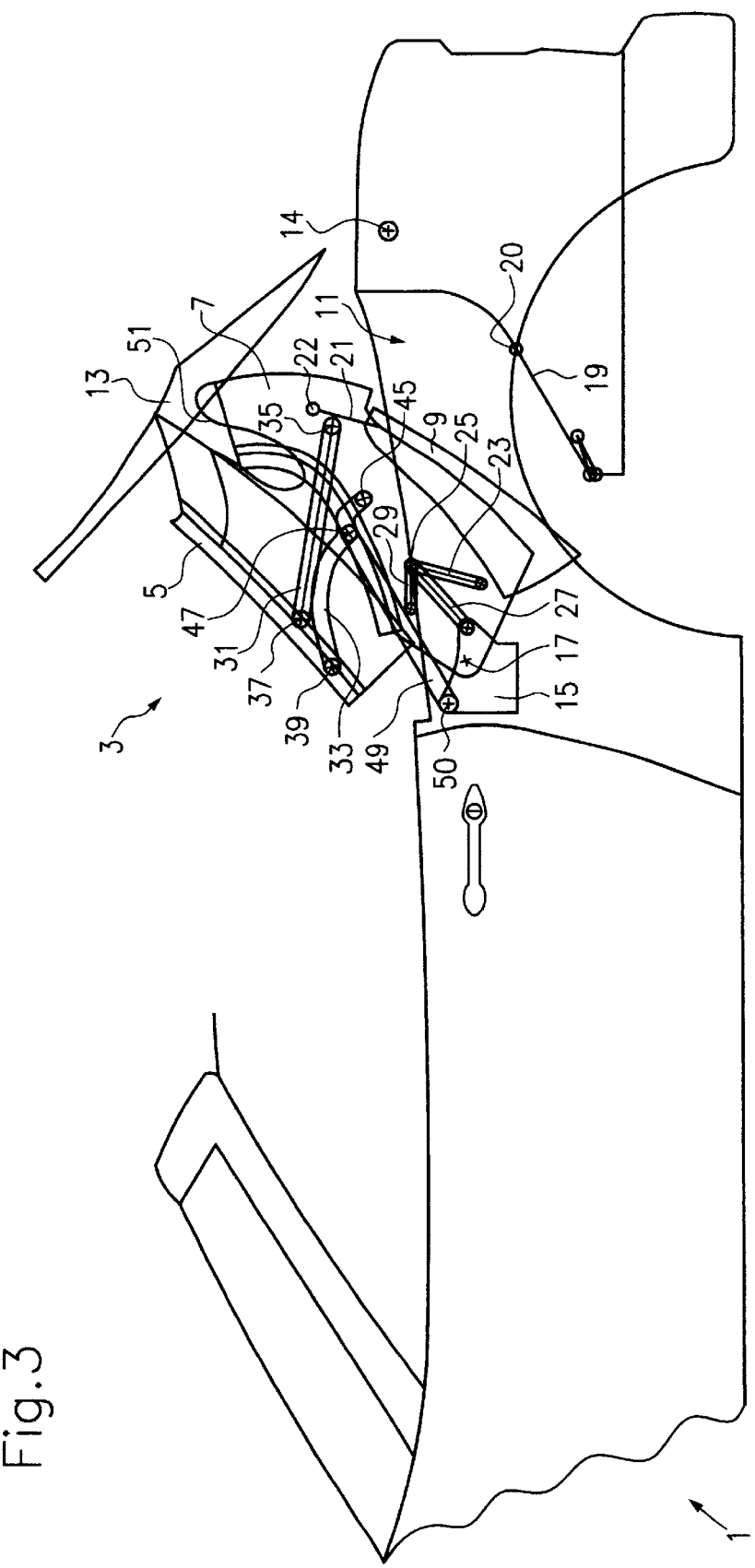
FIG. 3 shows a further progressed pivot movement of the hard top with respect to the position of FIG. 2.
Figure 4:
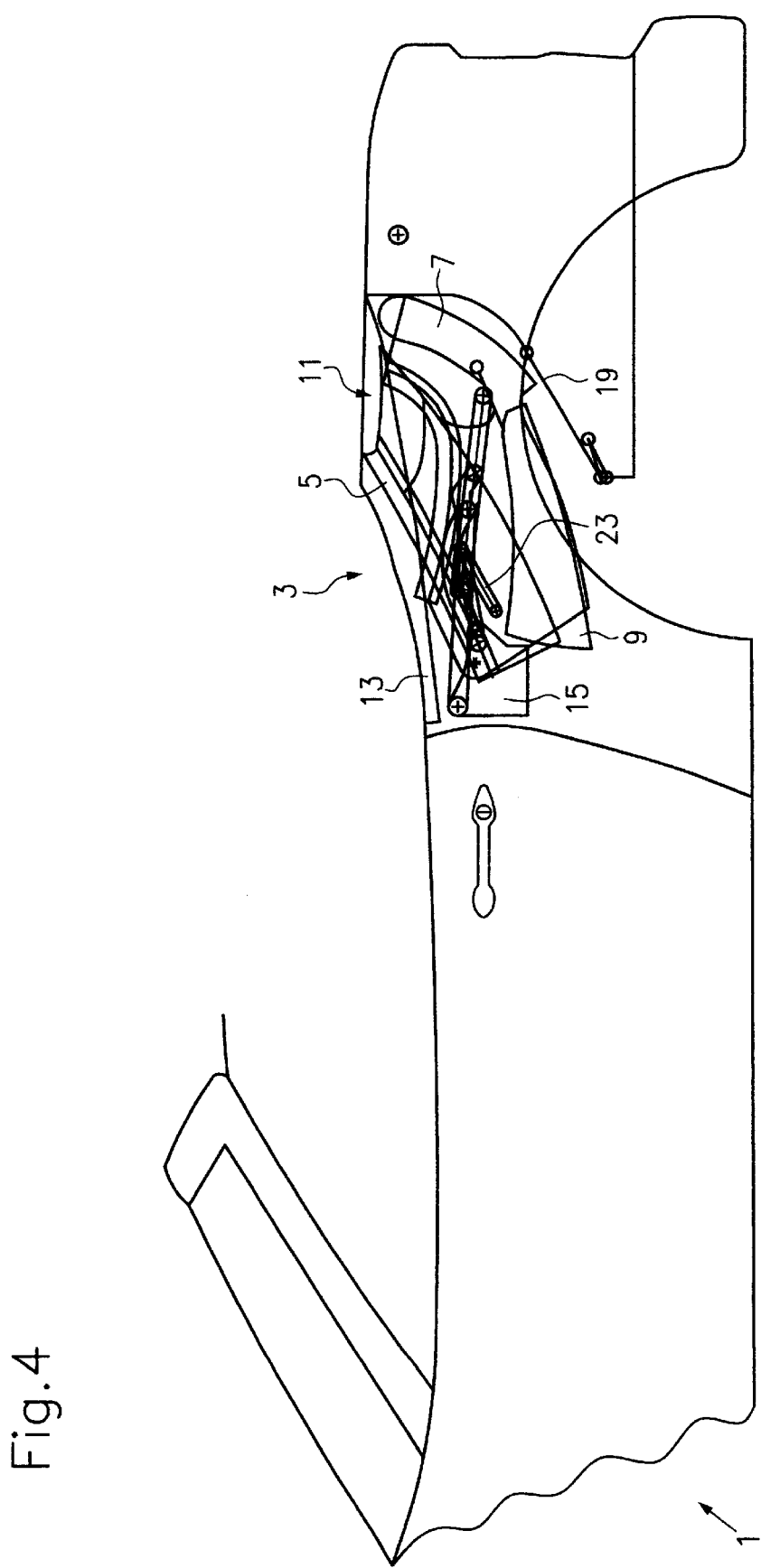
FIG. 4 shows the follow pivoted position of the hard top.

The rod assembly structure of the retractable hard top 3 will in particular be described closer with reference to FIGS. 2 to 4.

As may further be seen from FIG. 1, the accommodation space 11 comprises a bottom section 19, which is pivotally arranged around an axis 20, and in the position according to FIG. 1 is in its upwardly pivoted substantially horizontal position.

As may further be seen from FIG. 1, the rear window 9 is pivotally supported in its upper portion by means of a connection rod 21, wherein the connection rod 21 is rotatably supported around an axis of rotation 22. For the sake of clarity, FIG. 1 only diagrammatically shows a side of the rod assembly structure of the hard top 3 according to the invention. This rod assembly structure is substantially arranged in the longitudinal side range of the motor vehicle, wherein for reasons of clarity the rod assembly structure formed symmetrical thereto on the other longitudinal side of the motor vehicle is not shown.

In its lower portion, the rear window 9 comprising a rod 23 in a hinge point 25 at the end of the rod 23 is connected to two further connection rods 27 and 29. The connection nod 27 is hingedly connected to the support plate 15, and the connection rod 29 is connected to the second rear roof section 7. In the closed position of the hard top 3 according to FIG. 1, the connection rods 23 and 29 are in a straight line and the connection rod 27 extends substantially perpendicular thereto.

With reference to FIGS. 2 to 4, the lowering of the hard top 3 from its closed position according to FIG. 1 to its pivoted position according to FIG. 4 is described.

FIG. 2 shows a clear open position of the convertible top 3. To pivot the hard top 3, the cover 13 is first of all pivoted upwardly, and the bottom section 19 is pivoted around the axis 20 downwardly. This makes the access to the accommodation space 11 free, said access having maximum size.

As may clearly be seen from FIG. 2, the first roof section 5 is connected at each longitudinal side of the motor vehicle is connected via two connection rods to the rear roof section 7, namely a substantially straight connection rod 31 and a curved connection rod 33. The straight connection rod 31 is hingedly connected above the curved connection rod 33 to the rear second roof section 7 at 35. The hinge point 35 is located above the curved connection rod 33. At its other end, the straight connection rod 31 is hingedly connected to the first upper roof section 5 at 37. The hinge point 37 is arranged in front of a hinge point 39 which forms the front connection point of the curved connection rod 33.

In the example shown according to FIGS. 1 to 4, the curved connection rod 33 comprises two curved sections 41 and 43, wherein the section 41 is a front section and the section 43 is a rear section. The rear section 43 is hingedly connected to the second roof section 7 at 45. The curved connection rod 33 further comprises a hinged connection point 47 which forms a hinged connection of the curved connection rod 33 with a bent connection rod 49. The bent connection rod 49 is at its lower end hingedly connected to the support plate 15.

As may further be seen from FIG. 2, the retractable hard top 3 according to the invention comprises an outer cover 51 which is connected in the front portion of the upper first section 5 and at the rear second roof section 7 to the roof sections 5 and 7, respectively. In the central and rear portion of the upper first roof section 5, a connection between the outer cover 51 and the roof section 5 is not provided, as may be seen from FIG. 2.

As may further be seen from FIG. 2, the rear section of the upper first roof section 5 first of all pivots towards the bottom, which is carried out by means of the curved connection rod 33, and the upper first roof section 5 basically pivots around the hinge point 37.

As may be seen from FIG. 3, the bent connection rod 49 pivots around the hinge point 50 at the pedestal or support plate 15.

As may in particular be clearly seen from FIG. 3, a retraction of the rear window 9 into the interior of the rear second roof section 7 is generated in a positively guided manner by the connection rod mechanism of the connection rods 23, 27 and 29, which enables a significant saving of space when folding the retractable hard top 3 into the final retractable position shown in FIG. 4. As may be seen from FIG. 4, the rear window 9 is arranged almost completely within the rear roof section 7 and leaves a corresponding space below for further elements of the motor vehicle, e.g. for the fuel tank. In FIG. 4, the cover 13 is further lowered and covers the accommodation space 11.

Figure 5:
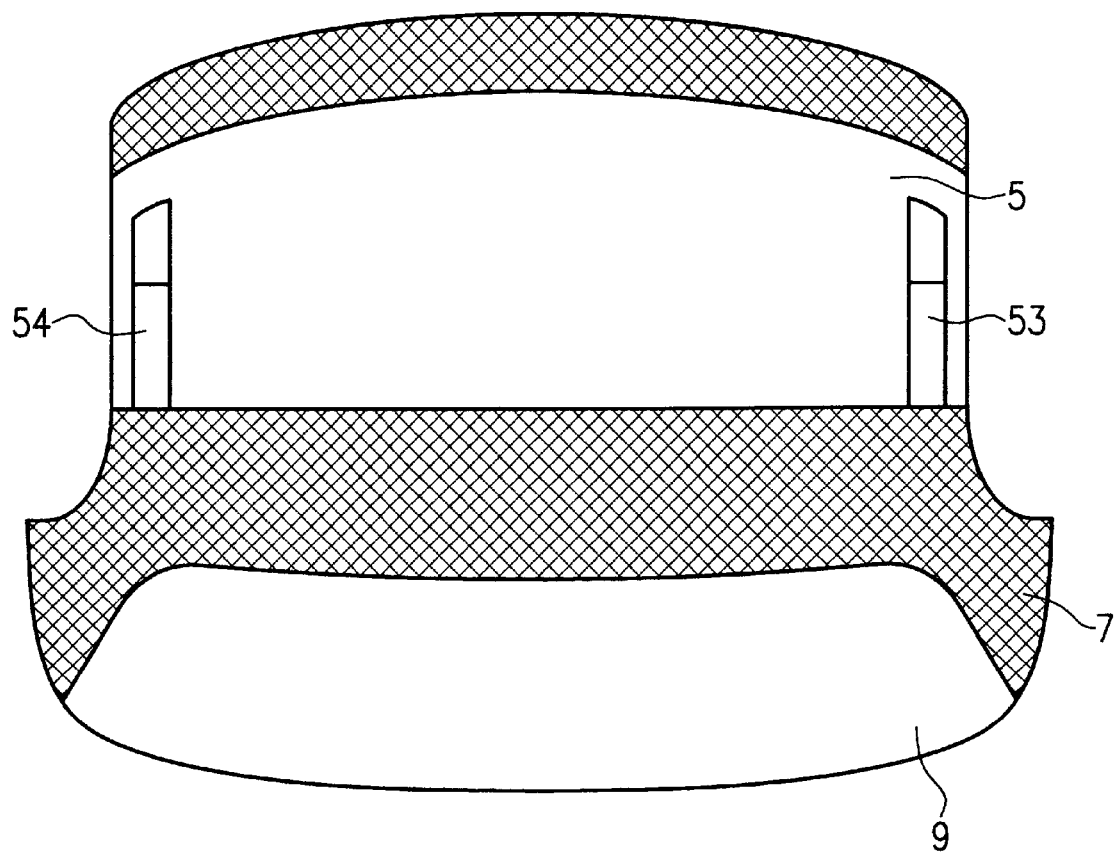
FIG. 5 shows a top view onto the first and second roof section.

FIG. 5 diagrammatically shows in a view from the top to the upper first roof section 5 and the rear second roof section 7. Thus, the view of FIG. 5 corresponds to a view from the top onto the closed top 3 according to FIG. 1, wherein, however, the outer cover 51 is taken off. The portions with crossed lining correspond to the connection portions of the outer cover 51 with the rear roof section 7 or the upper first roof section 5. Inbetween (not hatched) there is the portion that is not connected to the outer cover 51.

It can further be seen that slots 53 and 54 are formed along the two longitudinal sides of the upper first section 5, wherein the straight connection rods 31 and the curved connection rods 33, one rod for each longitudinal side, extend through these slots, as can easily be understood from the view of the three positions according to FIGS. 2 to 4.

The present invention therefore provides in an excellent manner a retractable hard top, which can be folded into the accommodation space of a motor vehicle in an especially space-saving manner, wherein by moving the rear window 9 into the interior of the rear section, an especially space-saving design is achieved.

The present invention is not restricted to the embodiment shown. The upper roof section may for instance be formed of more than only one part, e.g. for four-seated convertibles, and the multi-piece hard top can also be lowered in a correspondingly space-saving manner.

What is claimed is:

1. A retractable hard top for a motor vehicle having a body with a passenger compartment and a top storage compartment, said hard top being movable between an extended position covering the passenger compartment and a retracted position stored In the storage compartment, and comprising a substantially rigid front roof section, a substantially rigid rear roof section, a first rod assembly pivotally interconnecting the rear roof section and the body, and a second rod assembly pivotally interconnecting the front and rear roof sections, characterized in that the rear roof section includes an opening, a rigid rear window for closing the opening in top extended position, and pivot means for moving the rear window to a position into the interior of the rear roof section upon movement of the top to retracted position.

2. The retractable hard top as claimed in claim 1, further characterized in that the rear window pivot means includes a rod connecting to the body and a second rod connecting to the rear roof section.

3. The retractable hard top as claimed in claim 1, further characterized in that the second rod assembly comprises a four bar linkage which moves the front roof section to fan inverted position at least partially within the rear roof section in top retracted position.

4. The retractable hard top as claimed in claim 3, characterized in that the first and second rod assemblies and the pivot means are located on one side of the vehicle and duplicate third and fourth rod assemblies and second pivot means are located on the other side of the vehicle.

5. The retractable hard top as claimed in claim 4, characterized in that the front roof section includes a slot on each side through which the second and third rod assemblies operate to extend and retract the top.

6. The retractable hard top as claimed in any of claims 1–5 characterized in that the top includes a flexible outer cover which is connected to the front of the front roof section to the rear roof section so as to cover the top in extended position and to fold between the front and rear roof sections in top retracted position.

7. The retractable hard top as claimed in claim 1, characterized in that the hard top storage compartment comprises a bottom section that is pivoted about a substantially transverse axis to the body for movement to expand and retract the storage compartment.

* * * * *